(12) United States Patent
Hung

(10) Patent No.: US 7,783,794 B2
(45) Date of Patent: Aug. 24, 2010

(54) REMOTE USB ACCESS METHOD

(75) Inventor: Shang-Ching Hung, Gueishan (TW)

(73) Assignee: Aten International Co., Ltd. (TW)

( * ) Notice: Subject to any disclaimer, the term of this patent is extended or adjusted under 35 U.S.C. 154(b) by 252 days.

(21) Appl. No.: 11/945,326

(22) Filed: Nov. 27, 2007

(65) Prior Publication Data

US 2009/0138631 A1 May 28, 2009

(51) Int. Cl.
*G06F 13/00* (2006.01)

(52) U.S. Cl. ............... 710/31; 709/217; 711/162

(58) Field of Classification Search ........... 710/48, 710/31
See application file for complete search history.

(56) References Cited

U.S. PATENT DOCUMENTS

| | | | |
|---|---|---|---|
| 6,977,677 B1 * | 12/2005 | Shinohara | 348/211.5 |
| 7,139,932 B2 * | 11/2006 | Watanabe | 714/6 |
| 2005/0209842 A1 * | 9/2005 | Klein | 703/25 |
| 2006/0142991 A1 * | 6/2006 | Sajwani et al. | 703/25 |
| 2008/0109620 A1 * | 5/2008 | Nabekura | 711/162 |
| 2009/0024746 A1 * | 1/2009 | Welch | 709/228 |

* cited by examiner

*Primary Examiner*—Henry W. H. Tsai
*Assistant Examiner*—Elias Mamo
(74) *Attorney, Agent, or Firm*—Chen Yoshimura LLP

(57) ABSTRACT

An improved remote USB access method allows a local host to access USB devices on a remote host in a manner that reduces network traffic in certain situations. When the local host copies a file from a USB device A to a USB device B both located on the remote host, the operation is initially handled in a conventional manner by which data is transferred from device A to the local host over the network, and then from the local host to device B over the network. The remote host is provided with an ability to detect such an operation as a special case where the data transfer from the local host to device A is unnecessary. Thus, the remote host copies the data from device A to device B, and notifies the local host to stop the network data transfer from the local host to device B.

11 Claims, 8 Drawing Sheets

REMOTE USB ACCESS METHOD

BACKGROUND OF THE INVENTION

1. Field of the Invention

This invention relates to an improved remote USB (universal serial bus) access method and apparatus. In particular, it relates to an improved remote USB access method that reduces network traffic.

2. Description of the Related Art

Remote USB (universal serial bus) is a technology that allows a USB device connected to a USB port of a remote host to be accessed by a local host that is connected to the remote host by a network (see FIG. 1). The remote and local hosts may be a server, a personal computer, a peripheral device, etc. As illustrated in FIG. 1, the remote host 20 has one or more USB devices (one is shown here) A connected to its USB ports. The remote host 20 has a remote USB control section 22 for controlling the communication with the USB device A. The remote USB access method is implemented by the remote USB control section 22 on the remote host and a remote USB control section 12 on the local host 10. The remote USB control section 12 also controls local USB devices (if any) on the local host 10. The local host 10 also has a USB host section 14 with conventional USB host functions.

In operation, the remote USB control sections 12 and 22 communicate with each other to establish port connection between the local host and the USB devices on the remote host. Specifically (see FIG. 2), when a USB device A is plugged into a USB port on the remote host 20, the remote USB control section 22 carries out a conventional USB process to establish connection between the USB device A and the remote USB control section 22. The remote USB control section 22 then exchanges messages with the remote USB control section 12 on the local host 10 over the network to establish port connection between the remote USB control section 12 and the USB device A. After the port connection is established, the USB device A on the remote host 20 appears to the USB host 14 on the local host 10 to be a USB device A' on the local host 10. Such a USB device A' is sometimes referred to as a virtual USB device. Thus, when the USB host 14 on the local host 10 wishes to access the virtual USB device A' (for example, to read data from USB device A'), the USB host 14 sends a USB request to the remote USB control section 12. The remote USB control section 12, which has knowledge of the location of the USB device A, passes the USB request to the remote USB control section 22 on the remote host 20 via the network. The remote USB control section 22 accesses the USB device A to obtain a response to the USB request (for example, the data requested to be read). The remote USB control section 22 sends the response over the network to the remote USB control section 12 on the local host 10, which in turn passes the response to the USB host 14. The actual communication flow in this operation is schematically represented by the arrows 101 in FIG. 1. To the USB host 14, the communication appears to be with a USB device A' on the local host 10, as schematically represented by the arrows 102.

In many remote USB access operations involving two or more remote USB devices, the remote USB devices are physically located on the same remote host. For example, the remote USB operation may be to copy a file from a USB device A to a USB device B, where both USB devices are plugged into the same remote host. In such a situation, conventional remote USB access methods will cause the data from USB device A to be transmitted to the local host in a manner shown in FIGS. 1 and 2, and then cause this data to be transmitted from the local host to the USB device B on the remote host in a manner similar to that shown in FIGS. 1 and 2. The communication flow according to such a conventional method is shown in FIG. 3, where arrows 103 represent the communication flow. Arrows 104 represent the communication flow as it appears to the USB host 14. A and B represent two actual USB devices located on the remote host 20, and A' and B' represent two virtual USB devices as seen by the USB host 14 on the local host 10.

In a conventional remote USB access operation like that shown in FIG. 3, the data to be copied from USB device A to USB device B is transmitted via the network twice, once from USB device A via the remote host 20 to the local host 10, and once from the local host 10 via the remote host 20 to USB device B, even though both USB devices A and B are located on the same remote host 20.

SUMMARY OF THE INVENTION

Thus, by detecting the case where data is transferred between two USB devices on the same remote host, it is possible to implement a remote USB access method by which network traffic is reduced by approximately a half or more.

The present invention is directed to an improved remote USB access method and apparatus that substantially obviates one or more of the problems due to limitations and disadvantages of the related art.

An object of the present invention is to reduce network traffic generated by remote USB operations to lessen the burden on the network.

Another object of the present invention is to provide improved performance of remote USB connections with low overhead.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, the present invention provides an improved remote universal serial bus (USB) access method implemented in a system including a local host and a remote host connected by a network, the remote host having two or more USB ports each for connecting a USB device, the method including: the local host transmitting a plurality of USB requests to the remote host for accessing the two or more USB devices, including a first USB request requesting a transfer of data from a first USB device on the remote host to the local host and a second USB request requesting a transfer of data from the local host to a second USB device on the remote host; the remote host responding to the USB requests by performing the requested transfers of data; the remote host detecting whether a special case where the data transferred from the first USB device on the remote host to the local host and the data transferred from the local host to the second USB device on the remote host are the same is generated; if the special case is detected, the remote host transmitting a special case notification message to the local host, the special case notification message indicating the special case detected by the remote host, and transferring data from the first USB device on the remote host to the second USB device on the remote host; and in response to receiving the special case notification message, the local host stopping the transfer of data from the local host to the second USB device on the remote host.

In another aspect, the present invention provides an improved remote universal serial bus (USB) access method implemented on a local host for accessing two or more USB devices located on a remote host, the remote host being connected to the local host by a network, the method including: transmitting a plurality of USB requests to the remote host for accessing the two or more USB devices, including a first USB request requesting a transfer of data from a first USB device on the remote host to the local host and a second USB request requesting a transfer of data from the local host to a second USB device on the remote local host; receiving a special case notification message from the remote host, the special case notification message indicating a special case detected by the remote host; and in response to receiving the special case notification message, stopping the transfer of data from the local host to the second USB device on the remote host.

In another aspect, the present invention provides an improved remote universal serial bus (USB) access method implemented on a remote host, the remote host being connected to a local host by a network, the remote host having two or more USB ports each for connecting a USB device, the method including: receiving a plurality of USB requests from the local host for accessing the USB devices connected to the USB ports, including a first USB request requesting a transfer of data from a first USB device on the remote host to the local host and a second USB request requesting a transfer of data from the local host to a second USB device on the remote host; responding to the USB requests by performing the requested transfers of data; detecting whether a special case where the data transferred from the first USB device on the remote host to the local host and the data transferred from the local host to the second USB device on the remote host are the same is generated; and if the special case is detected, transmitting a special case notification message to the local host, the special case notification message indicating the special case detected by the remote host, and transferring data from the first USB device on the remote host to the second USB device on the remote host.

In yet another aspect, the present invention provides firmware loaded on a server that acts as a local host, and provides software loaded on a client computer that acts as a remote host that implement the above remote USB access method.

It is to be understood that both the foregoing general description and the following detailed description are exemplary and explanatory and are intended to provide further explanation of the invention as claimed.

A server is provided to comprise a universal serial bus (USB) host, a network interface, a processor connected to the USB host and the network interface, and a memory storing firmware. The firmware is configured to cause the processor to execute a remote USB access method for accessing two or more USB devices on a remote host connected to the server by a network. The method comprises: transmitting a plurality of USB requests to the remote host for accessing the two or more USB devices, including a first USB request requesting a transfer of data from a first USB device on the remote host to the local host and a second USB request requesting a transfer of data from the local host to a second USB device on the remote local host; and in response to receiving a special case notification message from the remote host, the special case notification message indicating a special case detected by the remote host, stopping the transfer of data from the local host to the second USB device on the remote host.

The remote USB access method further comprises: in response to receiving the special case notification message, detecting a special case mismatch by comparing the special case notification message received from the remote host with the USB requests transmitted from the local host to the remote host; and if a special case mismatch is detected, notifying the remote host by transmitting a special case mismatch notification message to the remote host.

A computer program product is provided to comprise a computer usable medium having a computer readable code embodied therein for controlling a computer, the computer being connected to a local host by a network, the computer having a two or more universal serial bus (USB) ports each for connecting a USB device, the computer readable program code configured to cause the computer to execute a remote USB access process, the process comprising: receiving a plurality of USB requests from the local host for accessing the USB devices connected to the USB ports, including a first USB request requesting a transfer of data from a first USB device on the remote host to the local host and a second USB request requesting a transfer of data from the local host to a second USB device on the remote host; responding to the USB requests by performing the requested transfers of data; detecting a special case where the data transferred from the first USB device on the remote host to the local host and the data transferred from the local host to the second USB device on the remote host are the same; and if the special case is detected, transmitting a special case notification message to the local host, the special case notification message indicating the special case detected by the remote host, and transferring data from the first USB device on the remote host to the second USB device on the remote host.

The process further comprises: receiving a special case mismatch notification message from the local host indicating the special case has been incorrectly detected; and in response to the special case mismatch notification message, performing error handling and state recovery.

The invention will become apparent from the following detailed description of the preferred but non-limiting embodiments. The following description is made with reference to the accompanying drawings.

DETAILED DESCRIPTION OF THE PREFERRED EMBODIMENTS

As required, a detailed illustrative embodiment of the present invention is disclosed herein. However, techniques, systems and operating structures in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein, which define the scope of the present invention. The following presents a detailed description of the preferred embodiment (as well as some alternative embodiments) of the present invention.

According to embodiments of the present invention, the remote USB control section on the remote host is provided with an additional ability of detecting certain remote USB access cases (referred to as special cases in this disclosure) where data transfer between remote USB devices can be achieved in a manner that reduced network traffic. If such a special case is detected, the behavior of both the remote host and local host will change as described in more detail below, with the result of reduced network traffic. In the descriptions below, a file copy from USB device A to USB device B on the same remote host is used as an example of a special case.

Figure 4:
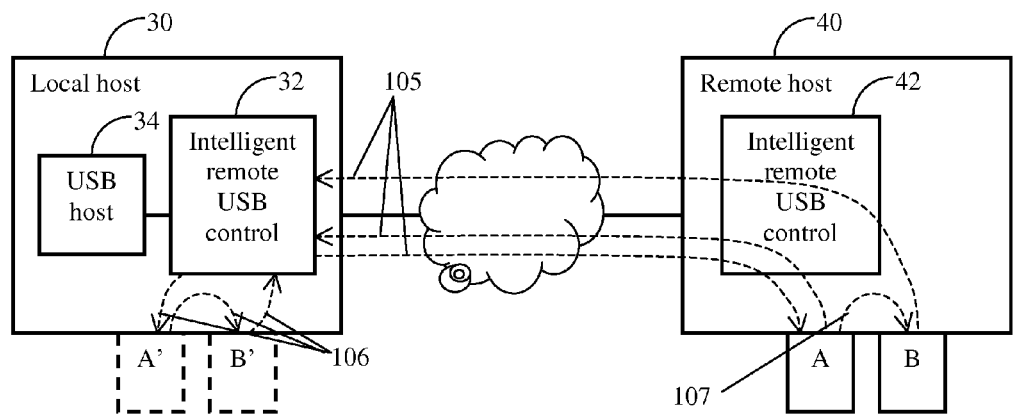
FIG. 4 schematically illustrates a local host and a remote host implementing an improved remote USB access method according to an embodiment of the present invention.

FIG. 4 illustrates a remote USB access system according to an embodiment of the present invention. A local host 30 and a remote host 40 are connected by a network, which may be a local area network (LAN), wide area network (WAN), Internet, Intranet, Ethernet, etc., and can be a wired or wireless network. The remote and local hosts may be a server, a personal computer, a peripheral device, etc. In one particular example, the local host 30 is a server and the remote host 40 is a personal computer. The remote host 40 has one or more USB devices (two are shown here) A and B connected to its USB ports. The remote host 40 has an intelligent remote USB control section 42 for controlling the communication with the USB devices on the remote host and implementing an improved remote USB access method according to embodiments of the present invention. The local host 30 has an intelligent remote USB control section 32 for implementing the improved remote USB access method on the local host side. The remote USB control section 32 also controls local USB devices (if any) on the local host 30. The intelligent remote USB control sections 32 and 42 may be implemented by processors, controllers or ASICs executing software or firmware. Alternatively, they may be implemented in hardware. In one embodiment, they may be implemented in software and firmware. The local host 30 also has a USB host section 34 with conventional USB host functions.

Figure 5:
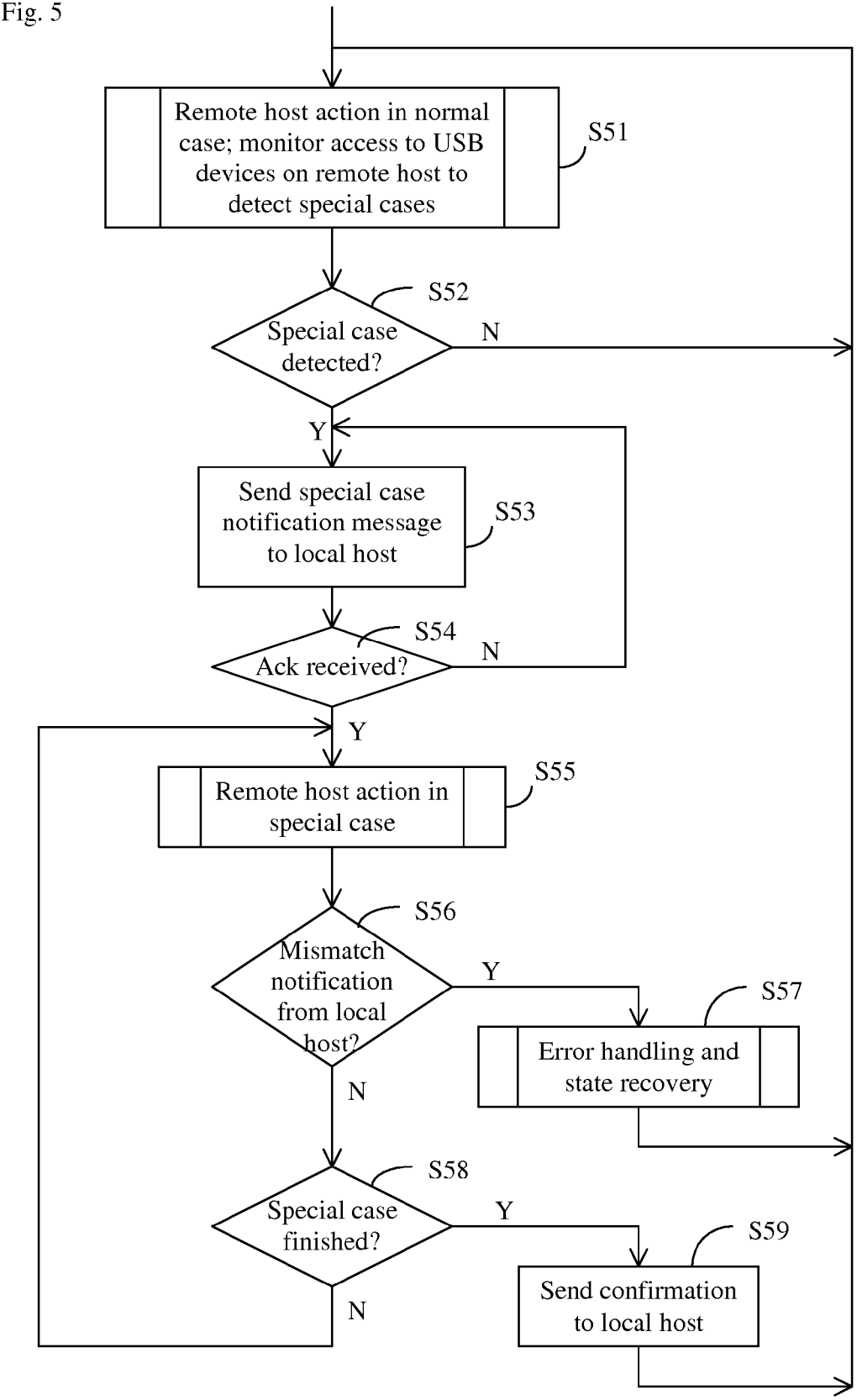
FIG. 5 illustrate a process executed by the remote host during an improved remote USB access operation according to an embodiment of the present invention.
Figure 6:
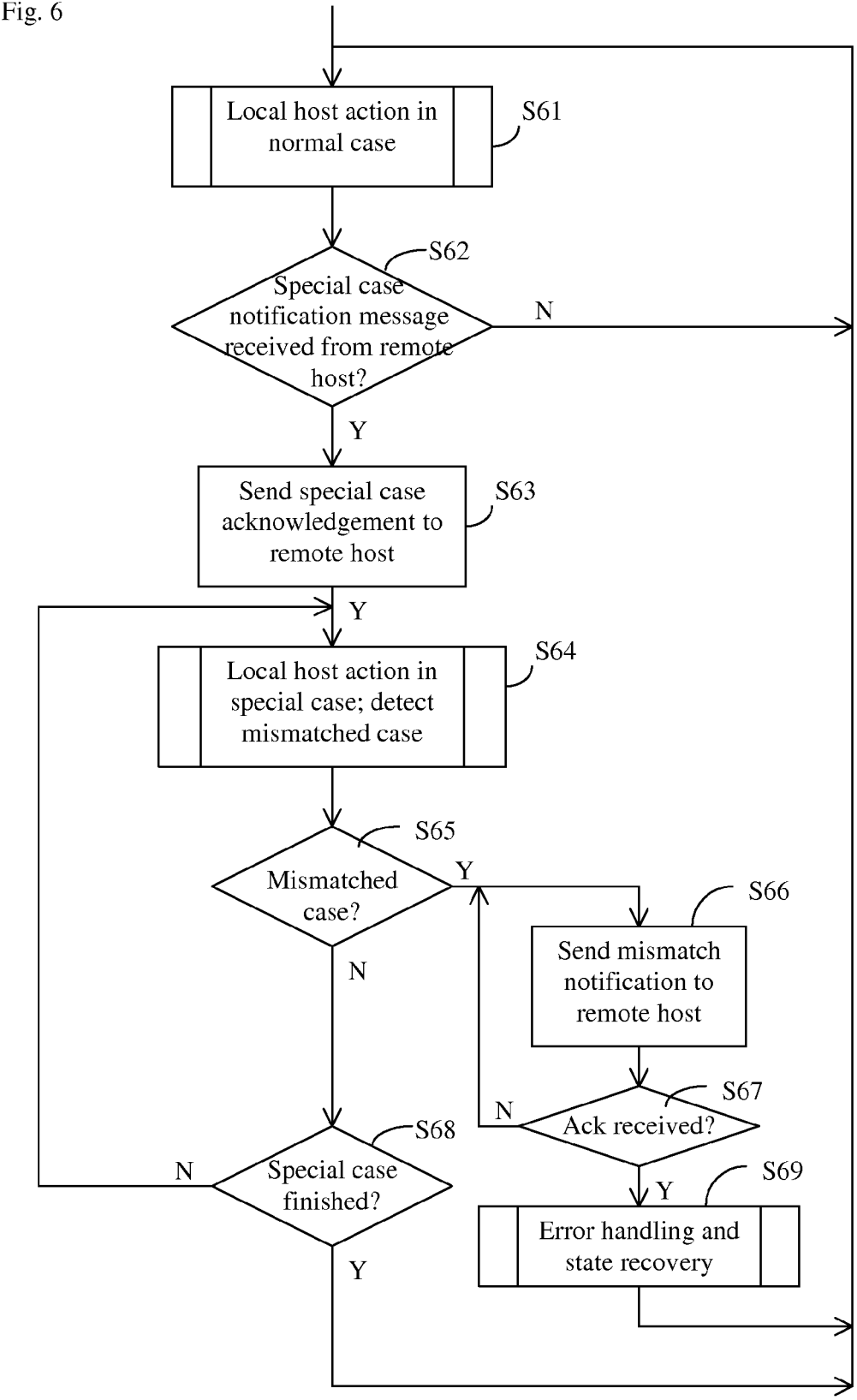
FIG. 6 illustrate a process executed by the local host during an improved remote USB access operation according to an embodiment of the present invention.

FIGS. 5 and 6 illustrate an improved remote USB access method according to embodiments of the present invention. FIG. 5 illustrates a process carried out by the intelligent remote USB control section 42 of the remote host 40; FIG. 6 illustrates a process carried out by the intelligent remote USB control section 32 of the local host 30. The steps that occur before steps S51 and S61, such as establishing the communication between the local host and the remote host, entering into normal case handling, etc., are not shown. On the remote host, during a remote USB access operation, while carrying out its actions in a normal way (e.g. responding to USB requests from the local host), the intelligent remote USB control section 42 continuously monitors the data being read from and written to USB devices located on the remote host 40 to determine whether the data transfer is a special case where data is transferred between two USB devices both located on the remote host (step S51). The remote host detects whether the special case is generated. The special case is not limited thereto. In the file copy example, the remote USB control section 42 first determines whether data is being read from one USB device (e.g. A) and concurrently data is being written into another USB device (e.g. B). If so, it compares the data read from USB device A with the data written to USB device B to determine if they contain identical data packets. If it is found that a number of consecutive data packets written into USB device B are identical to a number of consecutive data packets read from USB device A and that writing of these packets occurred within a predetermined time period after the reading, the intelligent remote USB control section 42 will determine that the remote USB operation is a potential special case operation where data is being copied from USB device A to USB device B. The step of determining whether the USB access is a special case essentially entails prediction of local host behavior. In other words, the remote host predicts that the local host will continue to request data to be read from USB device A and then written into USB device B.

If a special case is detected ("Y" in step S52), the remote host sends a special case notification message to the intelligent remote USB control section 32 of the local host 30 (step S53). If a special case is not detected ("N" in step S52), the process goes back to step S51. The special case notification message indicates that a special case has been detected and indicates the nature of the special case (e.g. "a copy from one USB device to another USB device on the same remote host is detected"). The special case notification message may be in many forms and its format may be defined by the hardware and/or software developer. For example, the special case notification message may be in the form of a code or other information that can be decoded or interpreted by the local host. If an acknowledgement is received from the local host ("Y" in step S54), the remote host proceeds to perform its special case action (step S55). If an acknowledgement is not received from the local host ("N" in step S54), the process goes back to step S53. In the file copy example, the special case action by the remote host includes copying the file directly from USB device A to USB device B. This data flow in the special case action is schematically represented by the arrow 107 in FIG. 4. Note that data transfer from USB device A to the local host is stilled carried out in the special case action. Special case action on the remote host continues until it is finished ("Y" in step S58), or until a special case mismatch notification is received from the local host ("Y" in step S56). As described in more detail later, a mismatch notification may be received if the local host determines that the remote host has incorrectly predicted the behavior of the local host. This may occur, for example, if the data pattern that caused the remote host to make the special case determination in fact occurred by coincidence. If a mismatch notification is received from the local host, the remote host performs error handling and state recovery (step S57) and then the process goes back to step S51. In the file copy example, error handling and state recovery may include deleting the data that has been written into USB device B, and requesting the local host to re-start the writing of data into USB device B.

If, on the other hand, the special case action is successfully finished ("Y" in step S58), the remote host sends a confirmation message to the local host (step S59), and waits for the next USB request from the local host (i.e. the process goes back to step S51 after step 59). If the special case is not finished ("N" in step S58), the process goes back to step S55.

In one embodiment, the step S51 is designated a normal action process. The steps S52, S53 and S54 are designated a discovery process. The steps S55, S56, S57, S58 and S59 are designated a special action process.

Figure 1:
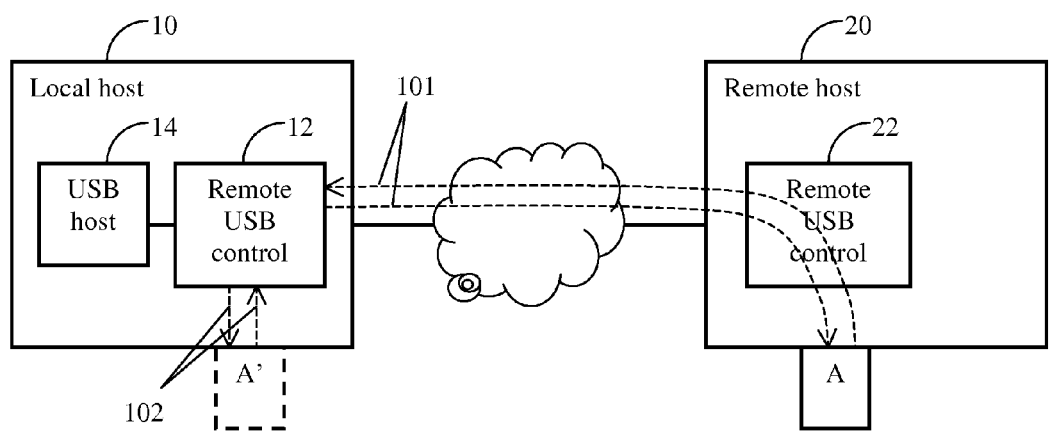
FIG. 1 schematically illustrates a local host and a remote host implementing a conventional remote USB access method.
Figure 3:
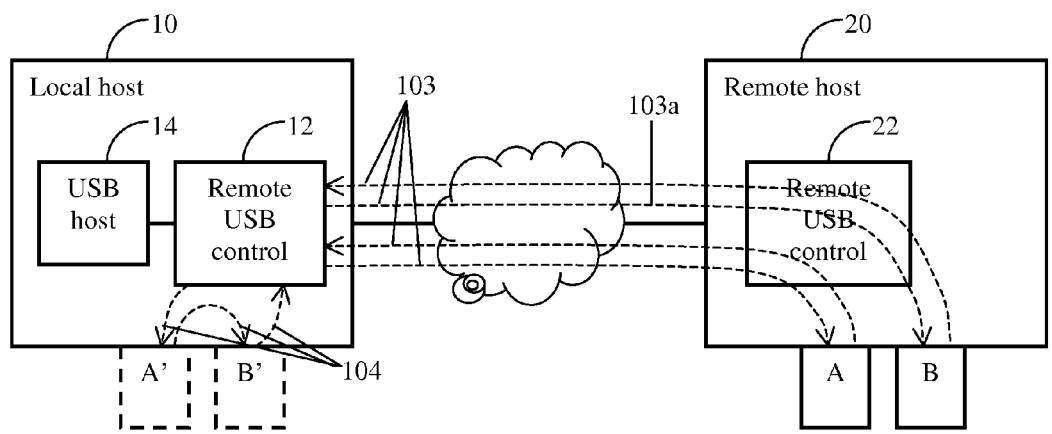
FIG. 3 schematically illustrates a local host and a remote host implementing a conventional remote USB access method in a file copy example.
Figure 2:
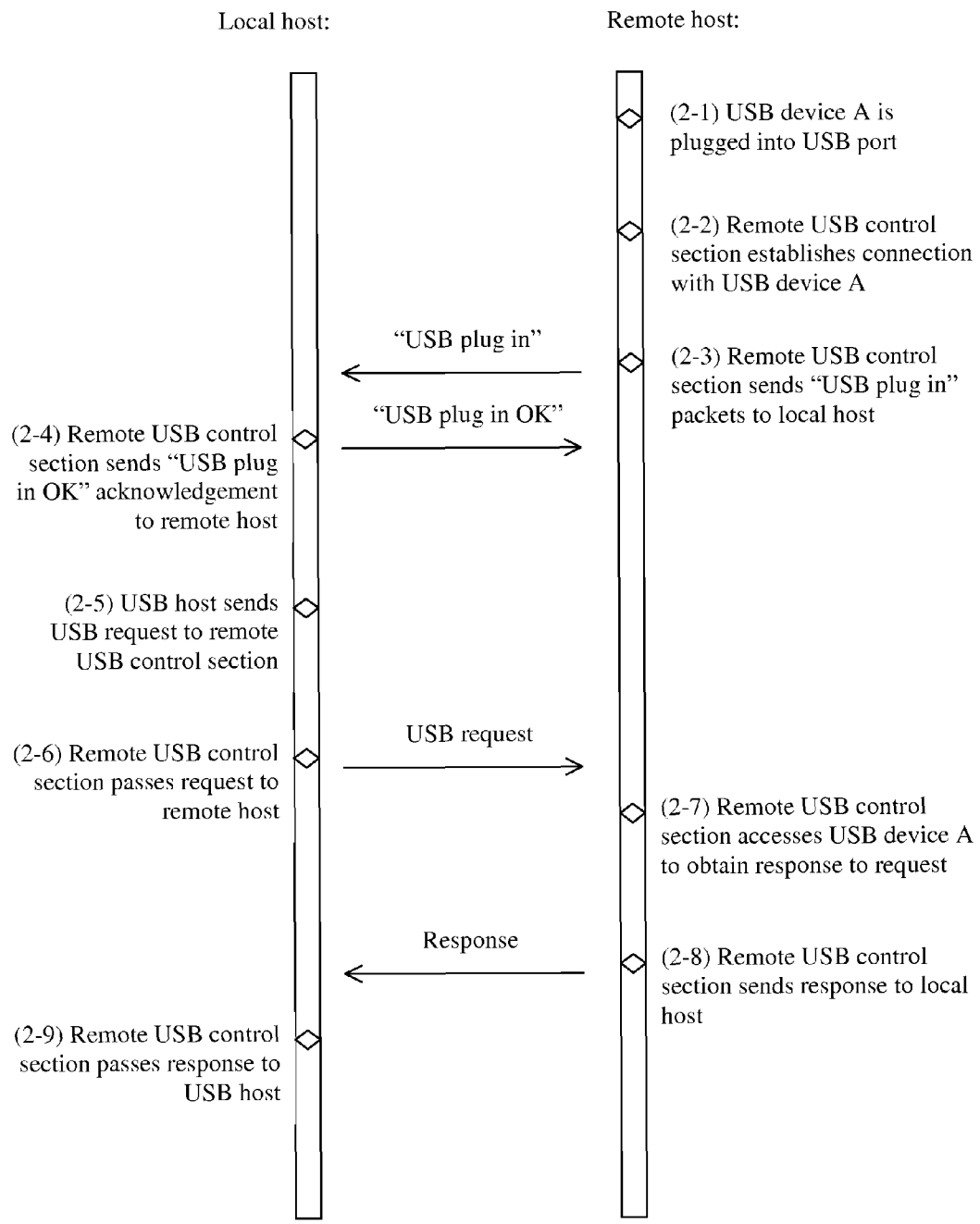
FIG. 2 is a sequence diagram illustrating a conventional remote USB access process.

On the local host 30 (see FIG. 6), the intelligent remote USB control section 32 carries out its actions in a normal way (e.g. sending USB requests to the remote host, including request to transfer data from the USB device A and to transfer data to the USB device B, etc.) (step S61), unless a special case notification message is received from the remote host informing the local host that a special case has been detected ("Y" in step S62). If a special case notification message is not received from the remote host ("N" in step S62), the process goes back to step S61. As described earlier, the special case notification message may contain information regarding the nature of the special case, in which case the local host 30 will determine its own action based on the nature of the special case, or contain a specific instruction to the local host. When a special case notification is received, the local host sends a special case acknowledgement message to the remote host (step S63), and proceeds to perform its special case action (step S64). In the file copy example, special case action includes stopping the transmission of data to the remote host to be written in USB device B. As schematically shown in FIG. 4, an arrow corresponding to the arrow 103a in FIG. 3 is not present in FIG. 4. As mentioned earlier, the remote host will continue to transmit data read from USB device A to the local host. Thus, if the USB host 34 intends to perform addition processing of the data read from USB device A (in addition to writing it back to device B), such additional processing is not affected.

Additionally, special case action on the local host includes determining if the remote host's special case determination has been incorrect. This is done by comparing the special case notification message received from the remote host to the remote USB access actions actually initiated by the local host. For example, if the special case notification message indicates that the remote host detected a special case of file copy from USB device A to USB device B, but in fact the local host did not initiate such a file copy, then the local host will determine that the remote host had incorrectly detected the special case. This might occur, for example but not limited thereto, when the local host initiates a data transfer from the remote USB device A to a storage connected to the local host and at the same time a data transfer (of different data) from the storage connected to the local host to the remote USB device B, where two data streams have some data sections in common. If the local host determines that the remote host's special case determination is incorrect (i.e. the local host detects a special case mismatch) ("Y" in step S65), the local host sends a mismatch notification message to the remote host (step S66), and returns to normal case action after an acknowledgement from the remote host is received ("Y" in step S67). If an acknowledgement from the remote host is not received ("N" in step S67), the process goes back to step S66. Error handling can be performed if necessary (step S69), and the process goes back to step S61. If no mismatch is detected, special case action on the remote host continues until it is finished ("Y" in step S68). If a special case is not finished ("N" in step S68), the process goes back to step S64.

In one embodiment, the step S61 is designated a normal action process. The steps S62 and S63 are designated a discovery process. The steps S64, S65, S66, S67, S68 and S69 are designated a special action process.

Figure 7:
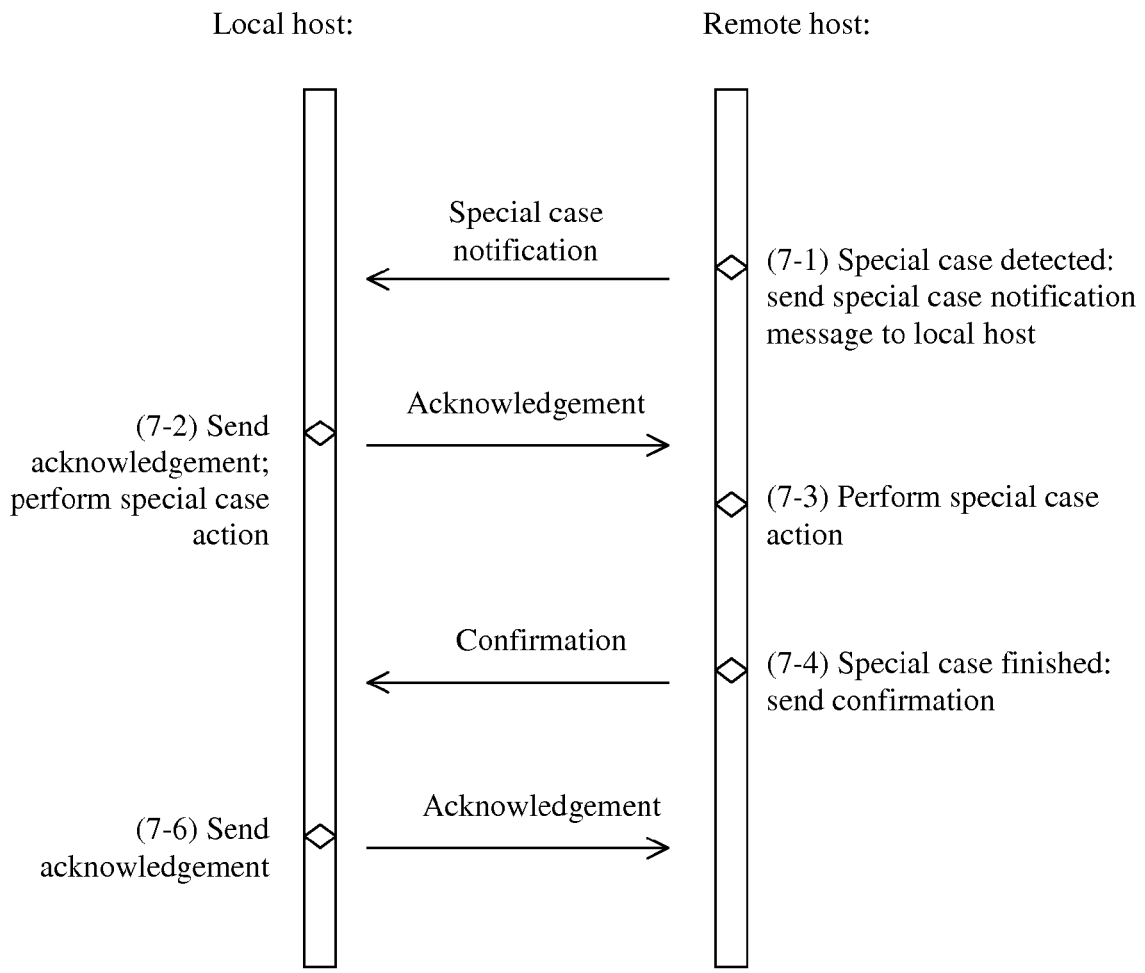
FIG. 7 is a sequence diagram illustrating messages passed between the remote host and the local host when a special case process is successful.
Figure 8:
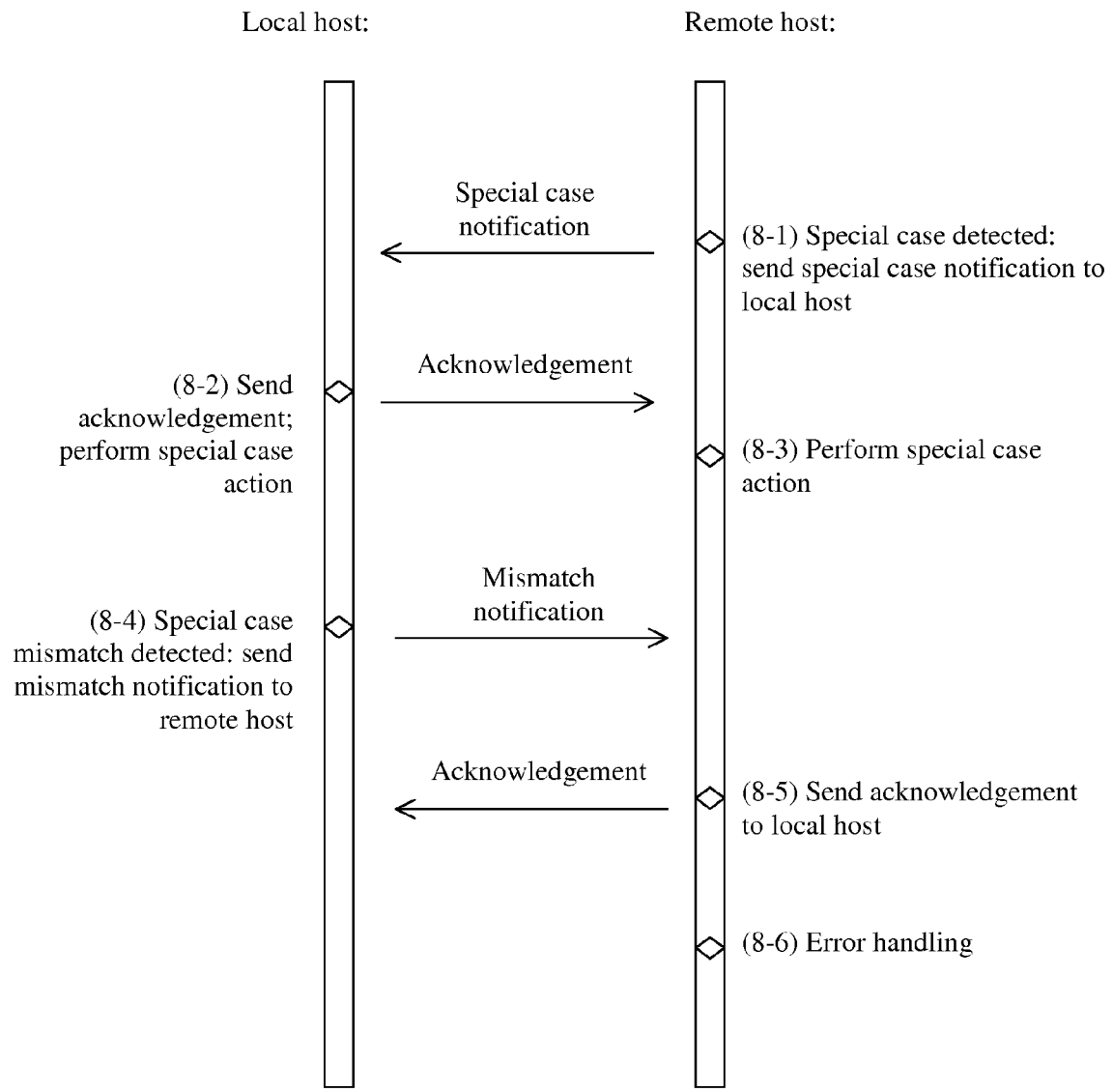
FIG. 8 is a sequence diagram illustrating messages passed between the remote host and the local host when a special case process is unsuccessful.

FIG. 7 is a sequence diagram illustrating the messages passed between the remote host and the local host when a special case process is successful. FIG. 8 is a sequence diagram illustrating the messages passed between the remote host and the local host when a special case process is unsuccessful.

Referring to FIG. 7, firstly, a special case notification message is transmitted from the remote host to the local host. Then, a first acknowledge is transmitted from the local host to the remote host. A confirmation is transmitted from the remote host to the local host when the special case is finished on the remote host. Subsequently, a second acknowledge is transmitted from the local host to the remote host.

Referring to FIG. 8, firstly, a special case notification message is transmitted from the remote host to the local host. Then, a first acknowledge is transmitted from the local host to the remote host. A mismatch notification is transmitted from the local host to the remote host. A second acknowledge is transmitted from the remote host to the local host. Subsequently, an Error handling is executed in remote host.

It should be understood that in FIGS. 5 and 6, prior to step S51 and S61, the remote USB control sections 32 and 42 carry out the conventional process of attaching the USB devices A and B. They also begin the remote USB access operation in a normal (conventional) way, until a special case is detected.

Figure 9A:
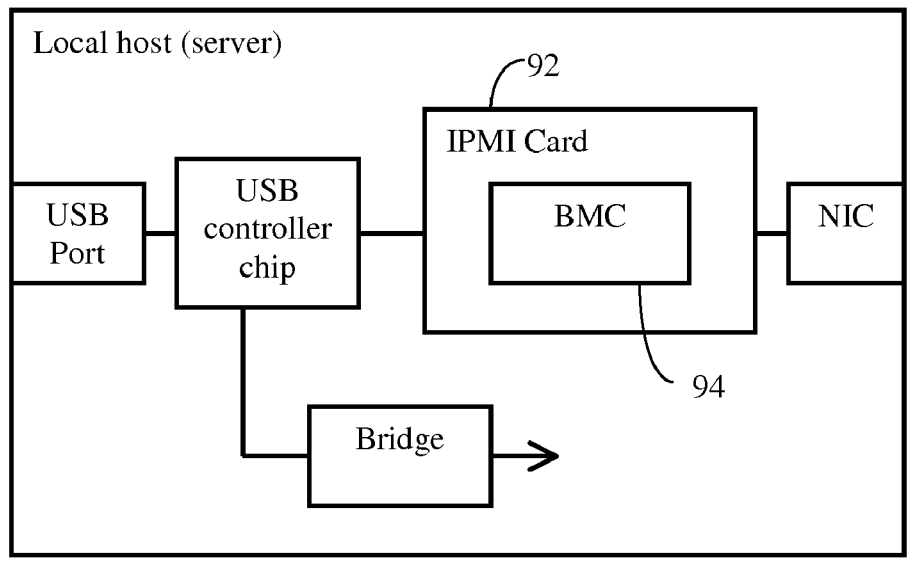
FIGS. 9A and 9B illustrate two hardware configuration examples for implementing the improved remote USB access method on a local host.
Figure 9B:
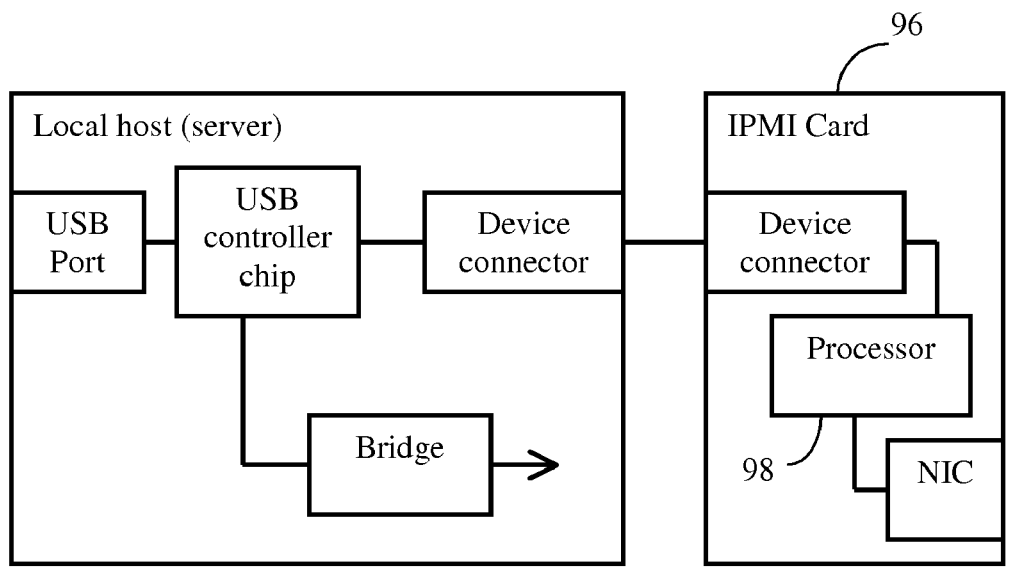

FIGS. 9A and 9B illustrate two particular examples of hardware configuration of a local host that implements the improved remote USB access method. In the example of FIG. 9A, the local host is a server having an Intelligent Platform Management Interface (IPMI) function. The IPMI card 92 includes a main controller called the Baseboard Management Controller (BMC) 94, and the improved remote USB access function is implemented as firmware stored in a memory and executed by the BMC 94. Using such an implementation, the improved remote USB access method can be provided in an existing server in conjunction with installing the IPMI card 92. The IPMI card 92 is connected between the USB controller chip and a network interface chip/circuit/controller (NIC). The NIC is connected to the remote host via the network. The USB controller chip is connected to other device in the local host via at least one bridge. A storage may be connected to the local host via a USB port connected to the USB controller chip. In one embodiment, the IPMI card 92 further includes a KVM over IP function.

In FIG. 9B, the improved remote USB access function is implemented in a stand-alone device 96, as firmware stored in a memory and executed by a processor 98 of the stand-alone device. This implementation would also allow the improved remote USB access method to be provided to an existing server.

In both the examples of FIGS. 9A and 9B, the remote host may be a PC connected to the server, where the improved remote USB access method is implemented by software loaded into the PC.

An improved remote USB access method according to embodiments of the present invention is especially advantageous in a system where the bandwidth of Internet access is the bottleneck.

In addition to the local file copy example shown in FIGS. 3 and 4, another example (see FIG. 10) where reduction of network traffic is possible is when data is transferred from a USB device A on a first remote host 40A to a USB device B on a second remote host 40B, where the first and second remote hosts are connected to each other by a local area network (LAN), a wide area network (WAN) or other fast connections 200 while both are connected to the local host 30A by the Internet. Using the approach described above, the first remote host 40A will send data from its USB device A to the USB device B on the second remote host 40B via the LAN or WAN, and the local host 30A will stop sending the data it receives from the first remote host 40A to the second remote host 40B over the Internet. This reduces Internet traffic and increases the speed of the operation. In this example, the special case detection is more conveniently performed on the local host 30A, because the remote hosts may not have sufficient knowledge to detect the special case. The local host 30A has knowledge of the locations of both USB devices A and B, and can make a determination as to whether data can be transferred in a manner that reduces network traffic. For example, based on the IP address of the two remote hosts, the local host may be able to determine that they are on the same LAN. The local host can then instruct the first remote host 40A to transfer data from the first USB device A to the second remote host 40B, and instruct the second remote host 40B to store the data received from the first remote host on a USB device B of the second remote host.

Figure 10:
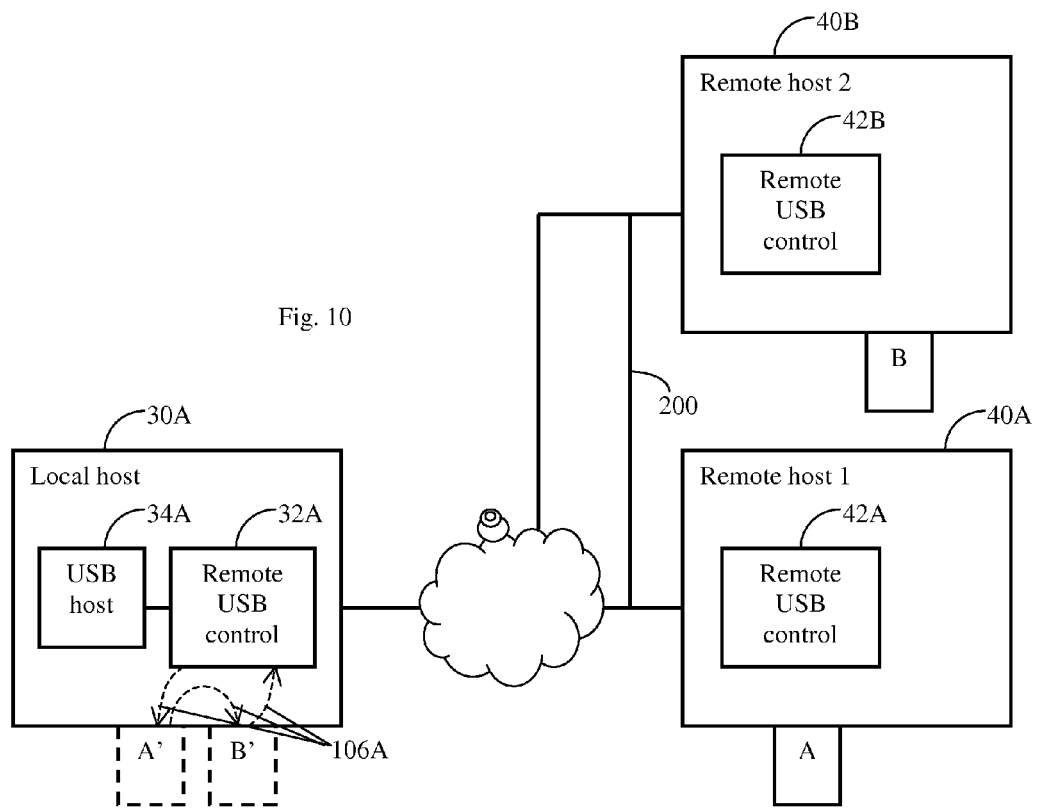
FIG. 10 schematically illustrates a local host and two remote hosts implementing an improved remote USB access method according to another embodiment of the present invention.

In one embodiment, with respective to the remote host 40A, the local host 30A in FIG. 10 executes the normal action process, the discovery process and the special case action process in FIG. 5 that are performed by the remote host 40 in FIG. 4. In other words, the local host 30A in FIG. 10 performs the processes similar to the flowchart of FIG. 5. Further, with respective to the local host 30A, the remote host 40A in FIG. 10 executes the normal action process, the discovery process and the special case action process in FIG. 6 performed by the local host 30 in FIG. 4. In other words, the remote host 40A in FIG. 10 performs the processes similar to the flowchart of FIG. 6.

More generally, a special case as used in this disclosure is any case where a modification of data transfer pattern can be made to accomplish the requested remote USB actions while reducing network traffic or increase operation speed. In addition to the examples described above, there may be many other examples of special cases. Such cases can be discovered and determined by hardware and software developers and manufacturers by analyzing the file transfer patterns. Such special cases can be handled using the general principle described above. All of such special cases are within the scope of this invention.

It will be apparent to those skilled in the art that various modification and variations can be made in the improved remote USB access method and apparatus of the present invention without departing from the spirit or scope of the invention. Thus, it is intended that the present invention cover modifications and variations that come within the scope of the appended claims and their equivalents.

What is claimed is:

1. An improved remote universal serial bus (USB) access method implemented on a local host for accessing two or more USB devices located on a remote host, the remote host being connected to the local host by a network, the method comprising:

transmitting a plurality of USB requests to the remote host for accessing the two or more USB devices, including a first USB request requesting a transfer of data from a first USB device on the remote host to the local host and a second USB request requesting a transfer of data from the local host to a second USB device on the remote host, wherein the USB requests effect copying of data from the first USB device on the remote host to the second USB device on the remote host;

receiving a special case notification message from the remote host, the special case notification message indicating a special case detected by the remote host where the data transferred from the first USB device on the remote host to the local host in response to the first USB request and the data transferred from the local host to the second USB device on the remote host in response to the second USB request are the same; and in response to receiving the special case notification message, stopping the transfer of data from the local host to the second USB device on the remote host.

2. The method of claim 1, further comprising:

in response to receiving the special case notification message, detecting a special case mismatch by comparing the special case notification message received from the remote host with the USB requests transmitted from the local host to the remote host; and if a special case mismatch is detected, notifying the remote host by transmitting a special case mismatch notification message to the remote host.

3. The method of claim 1, wherein the network includes Internet, Ethernet, Intranet, local area network (LAN), wide area network (WAN) or wireless network.

4. An improved remote universal serial bus (USB) access method implemented on a remote host, the remote host being connected to a local host by a network, the remote host having two or more USB ports each for connecting a USB device, the method comprising:

receiving a plurality of USB requests from the local host for accessing the USB devices connected to the USB ports, including a first USB request requesting a transfer of data from a first USB device on the remote host to the local host and a second USB request requesting a transfer of data from the local host to a second USB device on the remote host;

responding to the USB requests by performing the requested transfers of data, wherein the USB requests effect copying of data from the first USB device on the remote host to the second USB device on the remote host;

detecting whether a special case where the data transferred from the first USB device on the remote host to the local host in response to the first USB request and the data transferred from the local host to the second USB device on the remote host in response to the second USB request are the same is generated; and if the special case is detected, transmitting a special case notification message to the local host, the special case notification message indicating the special case detected by the remote host, and transferring data from the first USB device on the remote host to the second USB device on the remote host.

5. The method of claim 4, further comprising:

receiving a special case mismatch notification message from the local host indicating the special case has been incorrectly detected; and in response to the special case mismatch notification message, performing error handling and state recovery.

6. The method of claim 4, wherein the network includes Internet, Ethernet, Intranet, local area network (LAN), wide area network (WAN) or wireless network.

7. An improved remote universal serial bus (USB) access method implemented in a system including a local host and a remote host connected by a network, the remote host having two or more USB ports each for connecting a USB device, the method comprising:

the local host transmitting a plurality of USB requests to the remote host for accessing the two or more USB devices, including a first USB request requesting a transfer of data from a first USB device on the remote host to the local host and a second USB request requesting a transfer of data from the local host to a second USB device on the remote local host;

the remote host responding to the USB requests by performing the requested transfers of data, wherein the USB requests effect copying of data from the first USB device of the remote host to the second USB device of the remote host; and the remote host detecting whether a special case where the data transferred from the first USB device on the remote host to the local host in response to the first USB request and the data transferred from the local host to the second USB device on the remote host in response to the second USB request are the same is generated.

8. The method of claim 7, further comprising:

if the special case is detected, the remote host transmitting a special case notification message to the local host, the special case notification message indicating the special case detected by the remote host, and transferring data from the first USB device on the remote host to the second USB device on the remote host; and in response to receiving the special case notification message, the local host stopping the transfer of data from the local host to the second USB device on the remote host.

9. The method of claim 8, further comprising:

in response to receiving the special case notification message, the local host detecting a special case mismatch by comparing the special case notification message received from the remote host with the USB requests transmitted from the local host to the remote host; and if a special case mismatch is detected, the local host notifying the remote host by transmitting a special case mismatch notification message to the remote host.

10. The method of claim 9, further comprising:

in response to receiving the special case mismatch notification message from the local host, the remote host performing error handling and state recovery.

11. The method of claim 7, wherein the network includes Internet, Ethernet, Intranet, local area network (LAN), wide area network (WAN) or wireless network.

* * * * *